UNITED STATES PATENT OFFICE.

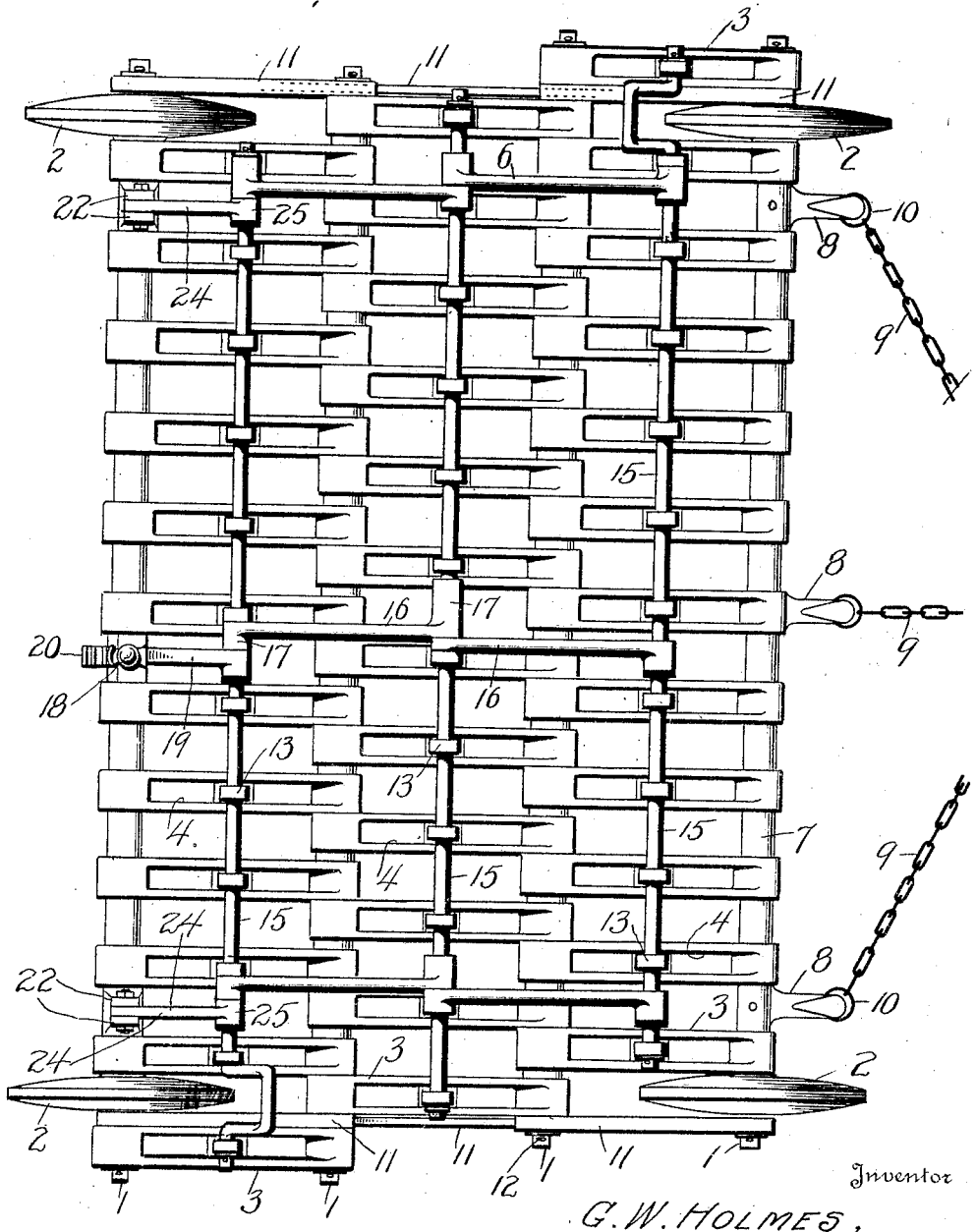

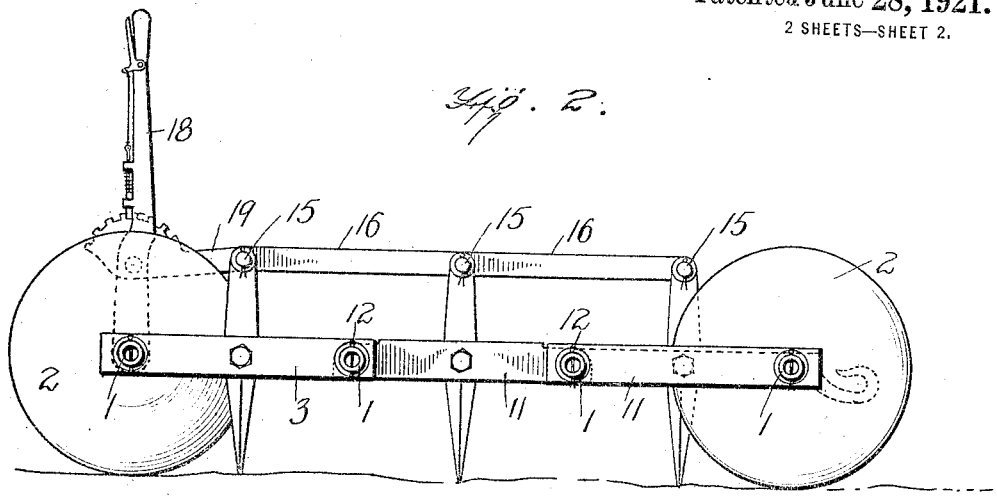
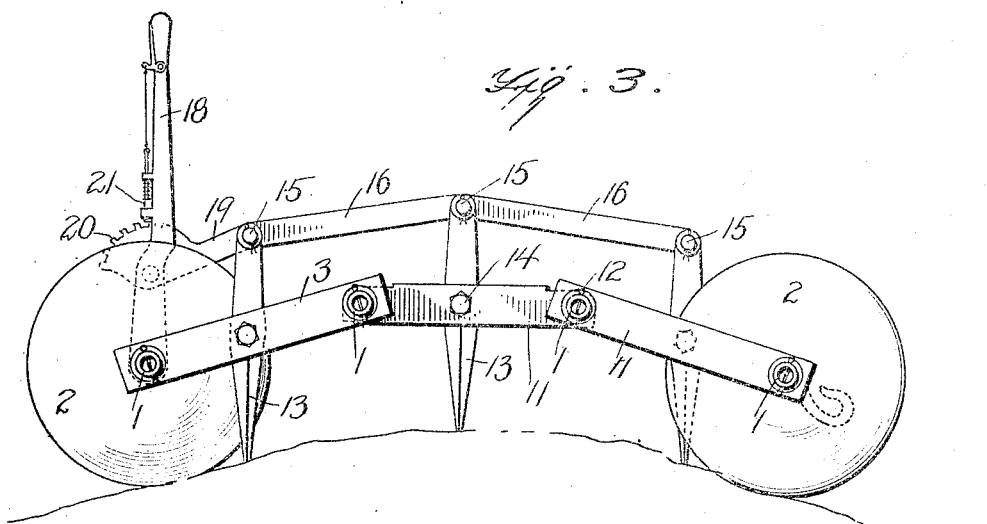
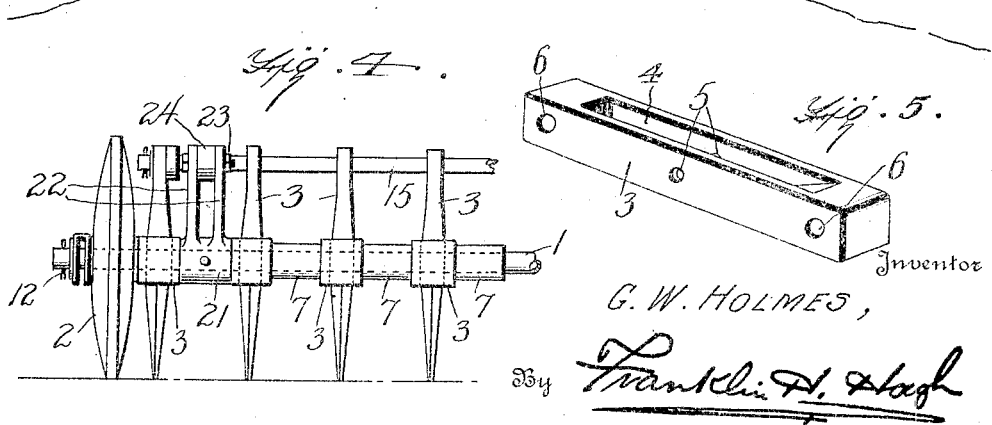
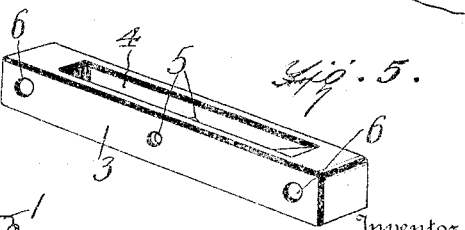

GEORGE W. HOLMES, OF VINCENT, ALABAMA.

HARROW.

1,382,977.  Specification of Letters Patent.  Patented June 28, 1921.

Application filed September 18, 1920. Serial No. 411,230.

*To all whom it may concern:*

Be it known that I, GEORGE W. HOLMES, a citizen of the United States, residing at Vincent, in the county of Shelby and State of Alabama, have invented certain new and useful Improvements in Harrows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide an improved form of harrow, mounted on wheels and constructed in a peculiar manner, so as to provide a maximum degree of flexibility.

With this object in view, the invention resides, generally stated, in a harrow, comprising a plurality of hinged sections, carrying pivoted harrow teeth and means for simultaneously rocking said teeth on their pivots, to adjust the position of the points thereof with reference to the ground.

The accompanying drawings clearly disclose the preferred form of my invention, like reference characters designating corresponding parts throughout the several views. Briefly described:

Figure 1 is a view in top plan of my harrow;

Fig. 2 is a view in side elevation thereof, illustrating the position of the hinged sections when the harrow is traveling over comparatively level ground;

Fig. 3 is also a view in side elevation, showing the position of the hinged sections when the harrow is traveling over uneven ground;

Fig. 4 is a fragmentary detail view in elevation of a portion of the harrow, and Fig. 5 is a detached detail view in perspective of one of the harrow teeth supporting members.

Referring now in detail to the drawings:

The harrow, in this instance, comprises the following parts: 1, 1, 1, 1 designate four rods, or shafts, which, as shown in Fig. 4, may be tubular, or hollow, for the sake of lightness. Revolubly carried on each of the end shafts 1, 1, toward each end thereof, are disks 2, 2, constituting wheels adapted to roll along the ground.

The shafts 1 pass loosely through apertures 6, 6 in the ends of a plurality of series of harrow-teeth supporting-members, each of which, in this instance, comprises a bar 3, provided with a longitudinally extending slot 4, the walls of each of said slots being transversely perforated, as shown at 5, 5, said perforations being alined.

Suitable means are provided for spacing these bars 3, one from the other, and in this instance, such means comprise collars 7, carried by the shafts 1, each collar being disposed between two adjacent bars.

Suitable means are provided for attaching a draft animal to the harrow, and in this instance such means comprise hook members 8, three thereof being shown in this instance, two being disposed at the ends of one of the end shafts 1, and the third hook to said shaft, intermediate the ends thereof, as shown clearly in Fig. 1. Chains 9 are provided with eyes 10 at one end thereof, which are slipped over the hooks of the hook members 8, as shown in Fig. 1.

Said shafts 1 also project loosely at their ends through the ends of side plates 11, dowel pins 12 passing through the shafts at the ends thereof, preventing disconnection of said plates from said shafts.

Harrow teeth 13 are pivoted, intermediate their ends, to the bars 3, and for this purpose pivot pins, or bolts, 14 are provided, which pass transversely through said bars, intermediate their ends. The upper ends of the harrow teeth 13 are pivotally connected to rods 15, three thereof being shown in the drawings.

Connecting the rods 15 at appropriate intervals are links 16, said links being loosely connected to said rods by means of lateral hubs 17, through which said rods loosely project.

Fulcrumed on one of the end shafts 1, preferably intermediate the length thereof, is an operating lever 18, to which is pivotally connected, intermediate the ends thereof, a link 19, which is pivotally connected at its opposite end to the adjacent rod 15. Said link 19 carries at one end an integral rack 20, coöperating with a spring pressed pawl 21', cconnected with the lever 18. It will be noted that, by swinging the lever, the link 19 will be actuated, imparting movement to the links 16, thus simultaneously rocking the harrow teeth 13 on their pivots 14, to incline said teeth away from the ground so that said harrow teeth will be disengaged from the ground when the harrow is being transferred from one field to another.

Preferably two cranks 21, 21 are fixedly secured at one end thereof, to one of the end shafts 1, each of said cranks comprising, as shown in Fig. 4, a hub portion encircling the shaft 1 and parallel arms 22, 22 rising from said hub portion. Pivotally connected to said crank arms 22, 22 at the upper ends thereof, as shown at 23, are crank rods 24, having at their opposite ends hubs 25, loosely encircling the adjacent rod 15. The function of these cranks 22 and crank rods 24 is to assist the link 19 in shifting the harrow teeth 13 on their pivots 14 when the lever 18 is actuated thus relieving strain from the link 19.

While I have shown two of such cranks, it is to be understood that more may be used if desired.

In operation, it will be noted that, since the harrow is of sectional construction, it is flexible, and adapts itself to the varying contour of the surface of the ground over which the harrow is traveling. Thus, when the harrow is traveling over comparatively level ground, all of the bars 3 will be in substantially the same horizontal plane, but when the harrow travels over uneven ground, as shown in Fig. 3, the two end series of bars 3 swing downward with reference to the intermediate series of bars 3, so that the several harrow teeth carried by the several series of bars will engage the ground.

What I claim to be new is:

1. In a harrow, a plurality of parallel shafts, the two end shafts carrying wheels, a plurality of series of harrow teeth supporting members, loosely connected with said shafts, harrow teeth pivotally supported by said members, parallel rods passing loosely through the upper ends of said harrow teeth, and links for connecting said rods, said rods passing loosely through said links.

2. In a harrow, a plurality of parallel shafts, the two end shafts carrying wheels, harrow teeth supporting bars loosely connected with said shafts and provided each with a longitudinally extending slot, harrow teeth projecting through said slots, and pivotally connected with said bars, rods passing through the tops of said harrow teeth, and links connecting said rods, said rods passing loosely through said links.

3. In a harrow, a plurality of parallel shafts, the two end shafts carrying wheels, harrow teeth supporting bars loosely connected with said shafts and provided each with a longitudinally extending slot, harrow teeth projecting through said slots, and pivotally connected with said bars, rods passing through the tops of said harrow teeth, links connecting said rods, said rods passing loosely through said links, and means for simultaneously moving said harrow teeth on their pivots.

In testimony whereof I hereunto affix my signature.

GEORGE W. HOLMES.